(12) United States Patent
Jaiswal et al.

(10) Patent No.: US 9,019,990 B2
(45) Date of Patent: Apr. 28, 2015

(54) USING ENCAPSULATION HEADERS TO INDICATE INTERNET PROTOCOL PACKET FRAGMENTATION IN CELLULAR NETWORKS

(75) Inventors: Suraj Jaiswal, Santa Clara, CA (US); Suchit Bansal, Milpitas, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 256 days.

(21) Appl. No.: 13/549,292

(22) Filed: Jul. 13, 2012

(65) Prior Publication Data

US 2014/0016545 A1    Jan. 16, 2014

(51) Int. Cl.
| | |
|---|---|
| H04J 3/24 | (2006.01) |
| H04W 80/02 | (2009.01) |
| H04L 29/06 | (2006.01) |
| H04L 29/08 | (2006.01) |

(52) U.S. Cl.
CPC ............. H04W 80/02 (2013.01); H04L 69/22 (2013.01); H04L 67/10 (2013.01)

(58) Field of Classification Search
CPC ..... H04L 47/36; H04L 47/365; H04W 28/60; H04W 28/065
USPC ................................. 370/474, 476
See application file for complete search history.

(56) References Cited

U.S. PATENT DOCUMENTS

| | | | | |
|---|---|---|---|---|
| 7,512,648 B2 * | 3/2009 | Natarajan et al. | ............. | 708/653 |
| 8,428,087 B1 * | 4/2013 | Vincent | ............. | 370/474 |
| 8,644,339 B1 * | 2/2014 | Krishna et al. | ............. | 370/471 |
| 2003/0076850 A1 * | 4/2003 | Jason, Jr. | ............. | 370/414 |
| 2011/0269495 A1 * | 11/2011 | Hapsari et al. | ............. | 455/517 |

OTHER PUBLICATIONS

"Internet Protocol, version 6 (IPv6)", S. Deering, Dec. 1998 (provided by IDS).*
"Internet Protocol, DARPA Internet forum, Protocol Specification", Sep. 1981 (provided by IDS).*
Parvall et al., "LTE Advanced-Evolving LTE Towards IMT-Advanced", 978-1-4244-1722-3/08/$25.00 © IEEE VTC 2008, 5 pages.
Telecom Assia.Net, "KT Reveals Cloud-Powered LTE", Dec. 8, 2011, http://www.telecomasia.net/blog/content/kt-reveals-cloud-powered-lte, 2 pages.
3GPP TS 23.401, "General Packet Radio Service (GPRS) Enhancements for Evolved Universal Terrestrial Radio Acess Network (E-UTRAN) Access, Release 9", 3GPP TS 23.401 v9.4.0 (Mar. 2010), 255 pages.

(Continued)

*Primary Examiner* — Peter Cheng
(74) *Attorney, Agent, or Firm* — Blakely Sokoloff Taylor & Zafman LLP

(57) ABSTRACT

A method of an aspect is performed in an Internet Protocol (IP) packet fragment reassembly system of a cellular network. The method is one of reassembling IP packet fragments that are destined for wireless devices. The method includes a step of receiving a plurality of encapsulated IP packet fragments. Each of the encapsulated IP packet fragments have an encapsulation header, an outer IP header, and an inner IP header. The method also includes a step of determining that the encapsulation headers indicate that the IP packet fragments are encapsulated. The method further includes a step of reassembling the IP packet fragments into a reassembled IP packet. A more fragments (MF) bit is set in the inner IP header of each, except for a last one, of the IP packet fragments.

3 Claims, 11 Drawing Sheets

(56) References Cited

OTHER PUBLICATIONS

RFC 791 IETF, "Internet Protocol", Sep. 1981, 50 pages, Sep. 1981, http://tools.ietf.org/html/rfc791.

Deering et al., IETF RFC 2460, "Internet Protocol", version 6 (IPv6) Specification, Dec. 1998, 37 pages. http://www.ietf.org/rfc/rfc2460,txt.

"3GPP TS 29.281, V11.3.0," 3rd Generation Partnership Project; Technical Specification Group Core Network and Terminals; General Packet Radio System (GPRS) Tunnelling Protocol, User Plane (GTPv1-U), (Release 11), Jun. 2012, 25 pages, 3GPP Organizational Partners (ARIB, ATIS, CCSA, ETSI, TTA, TTC), Valbonne, France.

"ETSI TS 129 281, V9.2.0," Universal Mobile Telecommunications System (UMTS); LTE; General Packet Radio System (GPRS), Tunnelling Protocol User Plane (GTPv1-U) (3GPP TS 29.281 version 9.2.0 Release 9), Apr. 2010, 26 pages, European Telecommunications Standards Institute 2010, Sophia Antipolis Cedex, France.

"KT, Intel and Samsung to Show off the World's First LTE CCC Solution based on Open Hardware Platform at Mobile World Congress 2011," Samsung Global News, Feb. 13, 2011, 2 pages, http://www.samsung.com/us/news/newsRead.do?news_seq=19815.

\* cited by examiner

USING ENCAPSULATION HEADERS TO INDICATE INTERNET PROTOCOL PACKET FRAGMENTATION IN CELLULAR NETWORKS

BACKGROUND

1. Field

Embodiments of the invention relate to the field of networking; and more specifically, to the packet fragmentation and reassembly.

2. Background Information

FIG. 1 is a block diagram of a 4th Generation (4G) Long Term Evolution (LTE) cellular network 100. An Evolved Packet Core 112 represents the network core of LTE. The EPC is a flat all-Internet Protocol (IP) based architecture. The EPC includes a Packet Data Network Gateway (PDN-GW) 103, a Serving Gateway (S-GW) 105, and a Mobility Management Entity (MME) 109. The PDN-GW is coupled with the Internet 101 (not part of the cellular network) over an SGi interface 102. The S-GW is coupled with the PDN-GW by S5/S8 interfaces 104. The MME is coupled with the S-GW by an S11 interface 108. An eNodeB 107 is coupled with the S-GW by an S1-U interface 106. The eNodeB is the name given to the base station in LTE. The eNodeB is coupled with user equipment (UE) 110 by an air interface 111 (e.g., evolved UMTS Terrestrial Radio Access Network (E-UTRA)). The user equipment may represent cellular phones, wireless computers, or other wireless devices. The PDN-GW, S-GW, MME, and eNodeB are logically separated entities in LTE, although they may be physically deployed on either the same or different network elements and may each be disposed on one or more network elements.

The 4G LTE network utilizes techniques to achieve high transmission speeds on the order of hundreds of megabits per second on the downlink, and on the order of tens of megabits per second on the uplink. The next generation air interface for LTE, called LTE-Advanced, which is already under development, is expected to have even higher per user speeds expected to be on the order of a gigabit per second on the downlink, and on the order of five hundred megabits per second on the uplink. Such high transmission speeds tend to place significant performance demands on the EPC or network core (e.g., in terms of control plane signaling scale, multi gigabit per second IP forwarding, security calculations, etc). In order to help support the existing speeds, as well as allow the speeds to increase over time, efficient packet processing should be performed within the EPC or network core.

One factor that significantly affects the efficiency of the packet processing within the EPC or network core is IP fragmentation and reassembly. Since the EPC is an all-IP based architecture, it needs to be able to handle IP fragmentation and reassembly. However, unnecessary IP fragmentation and reassembly tends to unnecessarily consume computational resources and/or increase packet latencies.

In the network core of LTE, an encapsulation or tunneling protocol is typically used to convey the IP packets. Currently, one of the most widely used protocols in LTE network cores is General Packet Radio Service (GPRS) Tunneling Protocol (GTP). GTP-U (e.g., GTPv1-U for version 1) is used for tunneling of user IP packets. GTP is typically used with user datagram protocol (UDP) as the transport protocol. The S5/S8 and S1-u interface use GTP to tunnel user IP packets to the UE. Further details of applying GTP to LTE are described in the document ETSI TS 129 281 V9.2.0 (2010-04), Technical Specification, 3GPP TS 29.281, Release 11.

Section 4.2.2 of this ETSI document provides that an inner IP packet shall be encapsulated at the GTPv1-U sender with a GTP header, user datagram protocol (UDP), and an outer IP header. If the resulting outer IP packet is larger than the maximum transmission unit (MTU) of the first link towards the destination GTPv1-U endpoint, fragmentation of the outer IP packet shall be performed by the sender as per IETF RFC 791 for an outer layer of IPv4 and IETF RFC 2460 for an outer layer of IPv6. The GTPv1-U sender should preferably fragment the outer IP packet to the smallest MTU of any link between GTPv1-U sender and GTPv1-U receiver.

However, there are several potential drawbacks to performing fragmentation on the outer IP packet (i.e., the IP packet encapsulating the received inner IP packet/payload). For one thing, if the outer packet is fragmented, then it may need to be reassembled and re-fragmented, one or sometimes multiple times while passing through the network core. For example, in IPv4 according to the specification reassembly is generally performed at the destination IP address and fragmentation may be performed at the source or at intermediate routers/switches. For example, if the outer packet is fragmented at the S5/S8 output interface of the PDN-GW, it may need to be reassembled at the S5/S8 input interface of the S-GW and then re-fragmented at the S1-U output interface of the S-GW. In case the outer IP packet is a fragment it will generally be reassembled at the ingress S5/S8 interface of SGW, because the outer IP header on S5/S8 interface has the destination IP anchored at SGW. Moreover, such reassembly and re-fragmentation may potentially also occur in one or more intermediate routers and/or switches (not shown) within the EPC or network core if the path MTU or link MTU is insufficient. Such additional fragmentations and reassemblies tend to increase the amount of computation and the packet latencies. For another thing, some network elements (e.g., some of the intermediate routers and/or switches) may potentially give less priority to and/or may potentially drop packet fragments when there is network congestion in order to help free up resources.

SUMMARY

In one aspect, a method is performed in an Internet Protocol (IP) packet fragment reassembly system of a cellular network. The method is one of reassembling IP packet fragments that are destined for wireless devices. The method includes a step of receiving a plurality of encapsulated IP packet fragments. Each of the encapsulated IP packet fragments have an encapsulation header, an outer IP header, and an inner IP header. The method also includes a step of determining that the encapsulation headers indicate that the IP packet fragments are encapsulated. The method further includes a step of reassembling the IP packet fragments into a reassembled IP packet. An advantage that may be achieved is that the IP packet fragment reassembly system may be able to determine from the encapsulation headers that IP packet fragments are encapsulated, and may be able to reassemble the IP packet fragments so that that the IP packet fragments don't need to be transmitted to the wireless devices. This may offer possible advantages such as reduced processing at the wireless devices, reduced traffic on the air interface, and less chance of packet fragments being lost.

In another aspect, an Internet Protocol (IP) packet fragment reassembly system. The system is operable to be coupled between Internet and wireless devices in a cellular network. The system is operable to reassemble IP packet fragments that are destined for the wireless devices. The system includes an IP module that is operable to receive a plurality of encapsulated IP packet fragments. Each of the encapsulated IP packet fragments is to have an encapsulation header, an outer IP header, and an inner IP header. The system also includes an IP packet fragment determination module operable to determine that the encapsulation headers indicate that the IP packet fragments are encapsulated. The system further includes an IP packet fragment reassembly module coupled with the IP packet fragment determination module and operable to reassemble the IP packet fragments into a reassembled IP packet. An advantage that may be achieved is that the IP packet fragment reassembly system may be able to determine from the encapsulation headers that IP packet fragments are encapsulated, and may be able to reassemble the IP packet fragments so that that the IP packet fragments don't need to be transmitted to the wireless devices. This may offer possible advantages such as reduced processing at the wireless devices, reduced traffic on the air interface, and less chance of packet fragments being lost.

In yet another aspect, a method is performed in an eNodeB of a Long Term Evolution (LTE) cellular network. The method is one of reassembling Internet Protocol (IP) packet fragments that are destined for user equipment (UE). The method includes a step of receiving a plurality of encapsulated IP packet fragments on an S1-U interface. Each of the encapsulated IP packet fragments has a General Packet Radio Service Tunneling Protocol (GTP) encapsulation header, an outer IP header, and an inner IP header. The outer IP headers do not indicate fragments. The method includes a step of determining that the GTP encapsulation headers indicate that the IP packet fragments are encapsulated. The method includes a step of reassembling the IP packet fragments into a reassembled IP packet. A MF bit is set in the inner IP header of each, except for a last one, of the IP packet fragments. The method includes a step of transmitting wireless signals derived from the reassembled packet to the UE over an air interface. An advantage that may be achieved is that the eNodeB may be able to determine from the GTP encapsulation headers that IP packet fragments are encapsulated, and may be able to reassemble the IP packet fragments using the MF bits set in the inner IP headers so that that the IP packet fragments don't need to be transmitted to the user equipment. This may offer possible advantages such as reduced processing at the user equipment, reduced traffic on the air interface, and less chance of packet fragments being lost.

In a further aspect, a method is performed in an Internet Protocol (IP) packet fragmentation network element. The network element is coupled between Internet and a base station in a cellular network. The method is one of indicating fragmentation of an IP packet to other network elements of the cellular network, without requiring that the other network elements reassemble IP packet fragments. The method includes steps of receiving the IP packet, determining to fragment the IP packet, and fragmenting the IP packet into a plurality of IP packet fragments. The method includes a step of setting a more fragments (MF) bit in an IP header of each, except for a last one, of the IP packet fragments. The method includes a step of encapsulating each of the IP packet fragments with an encapsulation header. The method includes a step of indicating in the encapsulation headers that the IP packet fragments are encapsulated. The method includes a step of transmitting the encapsulated IP packet fragments toward the other network elements of the cellular network. An advantage that may be achieved is that the other network elements of the cellular network are not required to reassemble the IP packet fragments. This may help to avoid one or more unnecessary reassemblies and fragmentations, which may help to avoid unnecessary computation, increased latency, and packet dropping.

In another aspect, an Internet Protocol (IP) packet fragmentation network element. The network element is operable to be coupled between Internet and a base station in a cellular network. The network element is operable to indicate fragmentation of an IP packet to other network elements of the cellular network, without requiring that the other network elements reassemble IP packet fragments. The network element includes a cellular network services module that is operable to receive the IP packet. The network element includes an IP packet fragmentation determination module coupled with the cellular network services module and operable to determine to fragment the IP packet. The network element includes an inner IP packet fragmentation module coupled with the IP packet fragmentation determination module and operable to fragment the IP packet into a plurality of IP packet fragments. The network element includes a more fragments (MF) bit adjustment module coupled with the inner IP packet fragmentation module and operable to set an MF bit in an inner IP header for each, except for a last one, of the IP packet fragments. The network element also includes an encapsulation module coupled with the inner IP packet fragmentation module and operable to encapsulate each of the IP packet fragments with an encapsulation header. The network element further includes an IP packet fragment indication module coupled with the encapsulation module and operable to indicate in the encapsulation headers that the IP packet fragments are encapsulated. The network element also includes an outer IP header generation module coupled with the encapsulation module and operable to generate an outer IP header for each of the encapsulated IP packet fragments. Each outer IP header is to have an MF bit that is cleared. An advantage that may be achieved is that the other network elements of the cellular network are not required to reassemble the IP packet fragments. This may help to avoid one or more unnecessary reassemblies and fragmentations, which may help to avoid unnecessary computation, increased latency, and packet dropping.

In a still further aspect, a Packet Data Network Gateway (PDN-GW), of an Evolved Packet Core (EPC) of a cellular network. The PDN-GW is operable to indicate fragmentation of an Internet Protocol (IP) packet to other network elements of the EPC, without requiring that the other network elements reassemble IP packet fragments. The PDN-GW includes an EPC services module that is operable to receive the IP packet which has been received through an SGi interface. The PDN-GW includes an IP packet fragmentation determination module coupled with the EPC services module and operable to determine to fragment the received IP packet. The PDN-GW includes an inner IP packet fragmentation module coupled with the IP packet fragmentation determination module and operable to fragment the IP packet into a plurality of IP packet fragments. The PDN-GW also includes a more fragments (MF) bit adjustment module coupled with the inner IP packet fragmentation module and operable to set an MF bit in an inner IP header for each, except for a last one, of the IP packet fragments. The PDN-GW further includes a General Packet Radio Service Tunneling Protocol (GTP) encapsulation module coupled with the inner IP packet fragmentation module and operable to encapsulate each of the IP packet fragments with a GTP encapsulation header. The PDN-GW includes an IP packet fragment indication module coupled with the GTP encapsulation module and operable to indicate in the GTP encapsulation headers that the IP packet fragments are encapsulated. The PDN-GW also includes an outer IP header generation module coupled with the GTP encapsulation module and operable to generate an outer IP header for each of the encapsulated IP packet fragments, wherein each outer IP header is to have an MF bit that is cleared. The PDN-GW further includes an interface selected from an S5 interface and an S8 interface to transmit the encapsulated IP packet fragments with the outer IP headers. An advantage that may be achieved is that the other network elements are not required to reassemble the IP packet fragments. This may help to avoid one or more unnecessary reassemblies and fragmentations, which may help to avoid unnecessary computation, increased latency, and packet dropping.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details, such as, for example, specific protocols, specific headers, specific sets and orders of operations, and specific component integration and/or partitioning decisions, and the like, are set forth. However, it is understood that embodiments of the invention may be practiced without these specific details. In other instances, well-known circuits, structures and techniques have not been shown in detail in order not to obscure the understanding of this description.

Figure 1:
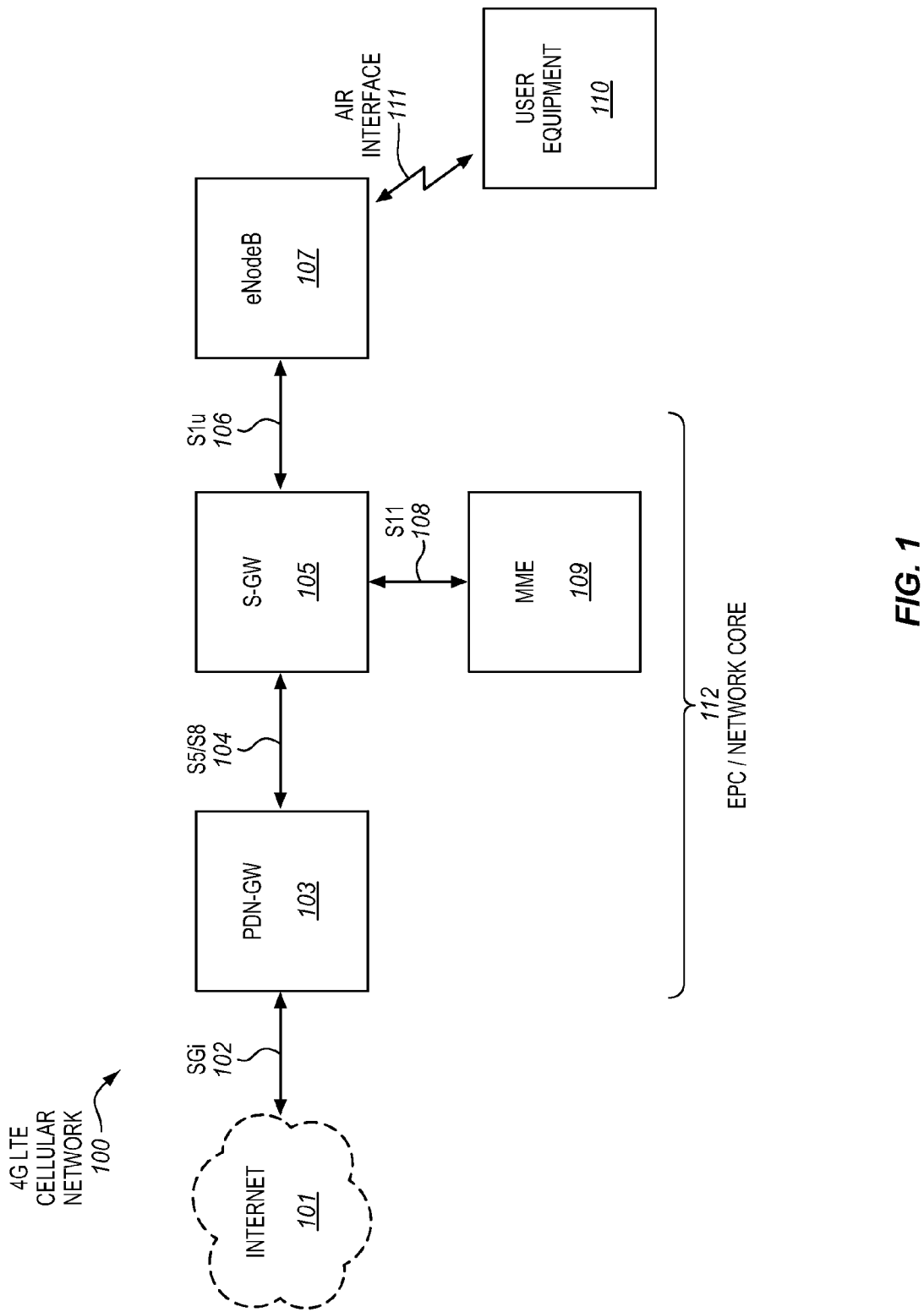
FIG. 1 is a block diagram of a 4th Generation (4G) Long Term Evolution (LTE) cellular network.
Figure 2:
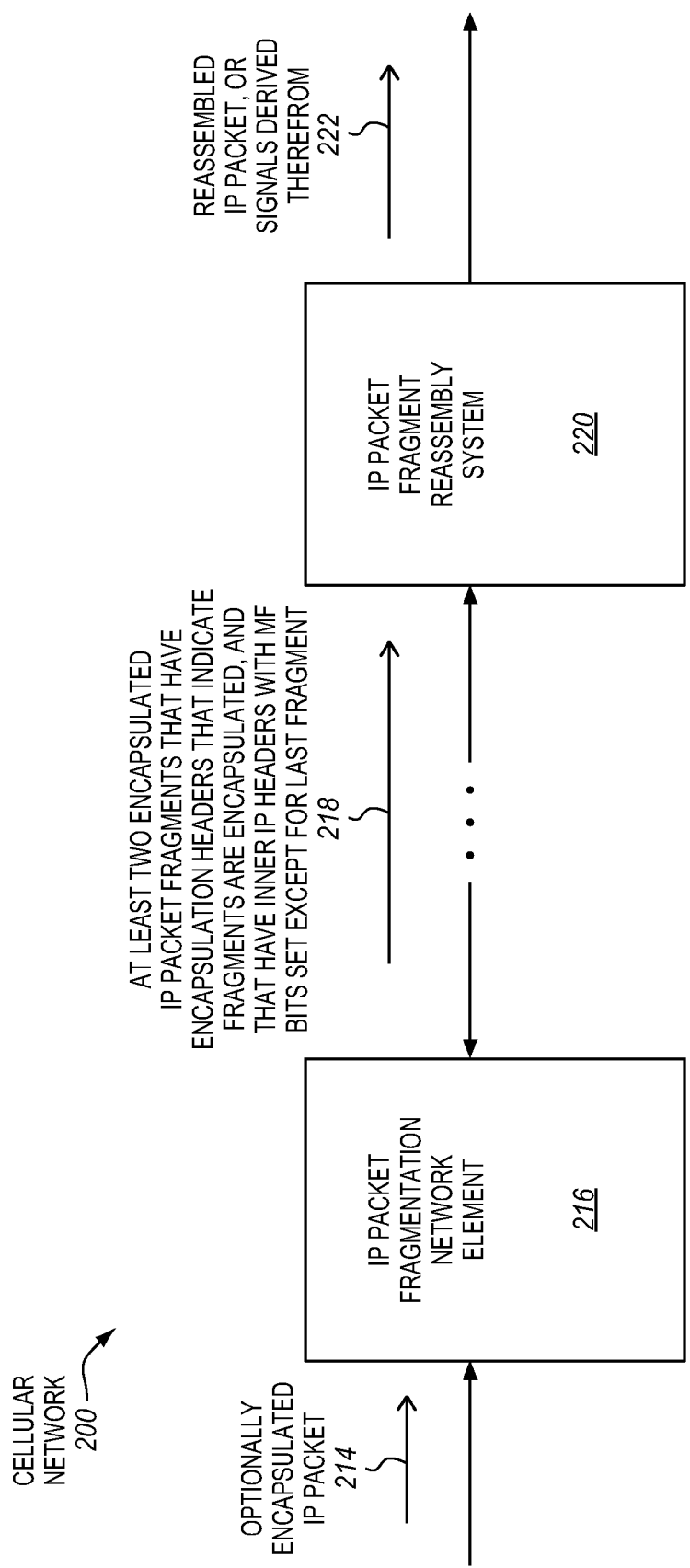
FIG. 2 is a block diagram of an embodiment of a cellular network.

FIG. 2 is a block diagram of an embodiment of a cellular network 200. The cellular network includes an IP packet fragmentation network element 216. In one embodiment, the IP packet fragmentation network element is a PDN-GW. In another embodiment, the IP packet fragmentation network element is an S-GW. In yet another embodiment, the IP packet fragmentation network element may combine PDN-GW and S-GW functionalities (e.g., be a combined gateway). Alternatively, the IP packet fragmentation network element may be another network element or component of a cellular network. The IP packet fragmentation network element is coupled to receive an optionally encapsulated IP packet 214. The IP packet may represent a unit of data exchanged between a pair of internet modules that includes an IP header. In some embodiments, the IP packet may have been received through some transport technologies (e.g., Metro Ethernet or Multi-protocol Label Switching (MPLS)) as an encapsulated packet. The IP packet fragmentation network element is operable to fragment the received IP packet into at least two encapsulated IP packet fragments 218. The encapsulated packet fragments may be portions of the data payload of the IP packet each with an IP header. In some embodiments, the at least two encapsulated IP packet fragments have encapsulation headers that indicate that packet fragments (i.e., as opposed to un-fragmented packets) are encapsulated. In some embodiments, each of the at least two encapsulated IP packet fragments, except for a last one, has an inner IP header that has a more fragment (MF) bit that is set (i.e., to binary one). The MF bit is also sometimes referred to as an MF flag and is commonly located in the IP header flags field. The IP packet fragmentation network element is operable to transmit the at least two encapsulated IP packet fragments on a network interface toward an IP packet fragment reassembly system 220.

In some embodiments, one or more optional intervening network elements (not shown) may be coupled between the IP packet fragmentation network element 216 and the IP packet fragment reassembly system 220. Advantageously, the intervening network elements may be shielded from determining that packet fragments are encapsulated because the outer IP headers do not have MF bits set or other indications of such. This may help to avoid or at least reduce unnecessary computation, increases in packet delivery latency, and/or packets being dropped. Without the encapsulation headers and their indication, if outer IP headers had MF bits set (i.e., instead of the inner IP headers), at least some of the intervening network elements would generally need to reassemble the packet fragments, which could lead to repeat unnecessary reassemblies and re-fragmentations.

Referring again to FIG. 2, the IP packet fragment reassembly system 220 is operable to receive the at least two encapsulated IP packet fragments 218 on a network interface. In one embodiment, the IP packet fragment reassembly system is an eNodeB or other IP processing portion of a base station (e.g., an IP capable base station, base station IP stack, base station controller, etc.). In another embodiment, the IP packet fragment reassembly system is at least a portion of (e.g., one or more servers of) a cloud radio access network (RAN) data center that implement at least a portion of a base station protocol stack. In yet another embodiment, the IP packet fragment reassembly system is an S-GW. Alternatively, the IP packet fragment reassembly network element may be another network element, component, or system of a cellular network. The IP packet fragment reassembly system is operable to determine from the encapsulation headers that the packet fragments are encapsulated. The IP packet fragment reassembly system is operable to reassemble the at least two encapsulated IP packet fragments into a reassembled IP packet. In some embodiments, the more fragment (MF) bits that are set in each, except for a last one, of the inner IP headers may be used to reassemble the IP packet fragments. The IP packet fragment reassembly system is operable to transmit the reassembled IP packet 222 (or signals derived from the reassembled IP packet), to one or more other components (e.g., to or toward cell phones or other user equipment) through a network interface.

Advantageously, the IP packet fragment reassembly system is able to determine from the encapsulation headers that packet fragments are encapsulated, and is able to reassemble the IP packet fragments. This may help to avoid needing to transmit the IP packet fragments (or signals derived therefrom) to wireless devices or other user equipment, which may help to reduce the amount of traffic over the generally limited and costly air interface. Moreover, this may also help to avoid the wireless devices or other user equipment needing to reassemble the IP packet fragments, which may help to reduce their processing/computation burden and/or their power consumption. Without the encapsulation headers and their indication, the inner IP headers and/or their MF bits would typically not be checked by network elements to determine that fragments were encapsulated, since this generally takes a lot of time and processing. As a result, the IP packet fragments would typically be transmitted over the air interface, and the reassembly would be left to the wireless devices or other user equipment.

Figure 3:
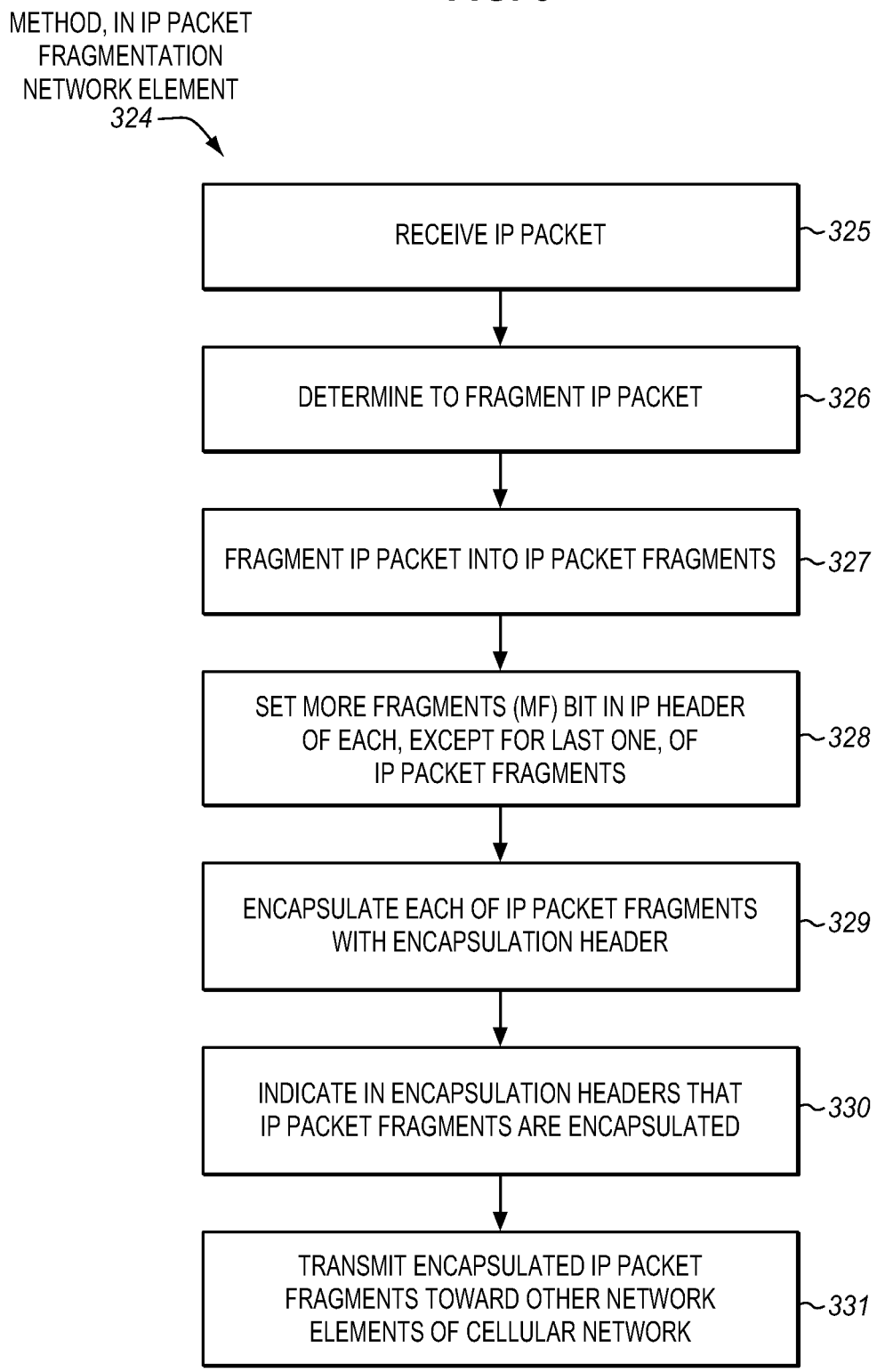
FIG. 3 is a block flow diagram of an embodiment of a method performed in an IP packet fragmentation network element.

FIG. 3 is a block flow diagram of an embodiment of a method 324 performed in an IP packet fragmentation network element of indicating fragmentation of an IP packet to other network elements of a cellular network without requiring that the other network elements reassemble IP packet fragments. The IP packet fragmentation network element may be coupled between Internet and a base station in the cellular network.

The method includes receiving the IP packet, at block 325. In some embodiments, the IP packet fragmentation network element may be a PDN-GW and the IP packet may have been received through an SGi interface. In other embodiments, the IP packet fragmentation network element may be an S-GW and the IP packet may have been received through one of an S5 interface or an S8 interface. The S5 interface may be used when the S-GW is in the home network. S8 may be used when the S-GW is in the roaming network and connecting to the home PDN-GW. In still other embodiments, the IP packet fragmentation network element may be a combined gateway having both PDN-GW and S-GW functionalities and the IP packet may have been received through an SGi interface. Alternatively, the IP packet fragmentation network element may be another network element or component of a cellular network and the IP packet may be received on another interface.

A determination to fragment the IP packet is made, at block 326. In some embodiments, the determination to fragment the IP packet may be based on a determination that a version of the received IP packet to be transmitted (e.g., an encapsulated packet) would exceed a Maximum Transmission Unit (MTU). A MTU represents the largest physical packet size that can be transmitted on a link or in a network. In one aspect, the MTU may be that of a first link into the cellular network. In another aspect, the MTU may be that of an overall path through the cellular network (e.g., to an eNodeB or other base station). For example, this may represent the smallest MTU of any link of the entire path.

The IP packet is fragmented into a plurality of IP packet fragments, at block 327. In some embodiments, it is the received IP packet (e.g., the one received at block 325) which is fragmented. The fragmentation may be performed using conventional approaches. In one aspect, each fragment except possibly the last has the size of the MTU. In another aspect, the IP packet may be cut in two, four, eight, etc. each time cutting the size of each fragment in half until they have the desired size relative to the implemented MTU. Other examples such as fragmenting the IP packet are also possible.

A more fragments (MF) bit is set in an IP header of each, except for a last one, of the IP packet fragments, at block 328. The MF bits are conventional bits in IP headers. For example, three-bits follow the identification field in the IPv4 header. The second bit (from high order to low order) is the DF (Don't Fragment) bit and the third bit is the MF bit. In some embodiments, the IP header is an inner IP header.

In some embodiments, the received IP packet may be an IP version 6 (IPv6) packet. IETF RFC 2460 provides that an IPv6 packet should not be fragmented in course. That is according to the specification fragmentation is generally performed only at the source. However, in a private network such as the EPC there is nothing preventing IPv6 fragmentation from being performed. In some embodiments the IPv6 packet may be fragmented despite the specification in order to help to maintain quality of service for the cellular network (e.g., avoid dropping a packet and/or reduce latency). This is done in case the source does not perform the appropriate path MTU discovery or sending an ICMP message to the source is prohibitively expensive in terms of packet latency. In fragmenting the IPv6 packet, an IPv6 extension header, fragment header, may be added to each of the IPv6 packet fragments, along with the IPv6 header. An M flag bit may be set in the fragment header of each, except for a last one, of the IPv6 packet fragments.

Each of the IP packet fragments is encapsulated with an encapsulation header, at block 329. In some embodiments, each of the IP packet fragments may be encapsulated with a GTP encapsulation header. GTP represents a commonly used encapsulation or tunneling protocol in LTE cellular networks. Alternatively, each of the IP packet fragments may be encapsulated with an encapsulation header according to a different encapsulation or tunneling protocol desired for the particular cellular network.

In some embodiments, in addition to adding an encapsulation header, one or more additional headers may optionally also be added. For example, in some embodiments a user datagram protocol or other transport header may also optionally be added to each of the IP packet fragments. In some embodiments, an outer IP header may be added to each of the transport header carrying IP packet fragments. In some embodiments, in the case of the outer IP header being an IPv4 header, MF bits in each of the outer IP headers may be cleared (i.e., not set). In another embodiment, the outer IP header may be an IPv6 header (e.g., an outer IPv6 header may be used to carry IPv4 fragments). In such an embodiment, the M flags of the outer IPv6 headers may be cleared.

At block 330, it is indicated in the encapsulation headers that the IP packet fragments (i.e., as opposed to un-fragmented packets) are encapsulated. In some embodiments, when the headers are GTPv1-u headers, this may include utilizing the fourth bit in the first octet or byte of the GTPv1-u headers using the 1-bit based position counting scheme followed by the 3GPP specification. (See e.g., FIG. 5 and the associated discussion further below.) This fourth bit is currently spare or reserved and/or available for use. This bit is sometimes referred to in the art as the "spare" or "reserved" bit of the first octet of the GTPv1-u header. Other embodiments may use other reserved or available bits of the encapsulation header for the given encapsulation protocol, or make the indication in different ways. For example, GTPv0-u and/or GTPv2-u may use one or more other spare and/or available bits in an analogous way as the fourth bit of the first byte was used in GTPv1-u.

The encapsulated IP packet fragments are transmitted to toward the other network elements of the cellular network, at block 331. They may be transmitted on a network interface.

Advantageously, the encapsulation headers may allow one or more other network elements of the cellular network to determine that packet fragments are encapsulated. However, the network elements are not required to reassemble the packet fragments. This may help to avoid or at least reduce unnecessary computation, increases in packet delivery latency, and/or packets being dropped. Without the encapsulation headers and their indication, if outer IP headers had MF bits set (i.e., instead of the inner IP headers), at least some of the intervening network elements would generally need to reassemble the packet fragments, which could lead to repeat unnecessary reassemblies and re-fragmentations. Moreover, when there is network congestion some network elements may be more inclined to drop packet fragments with the outer IP header having the MF bit set.

Figure 4:
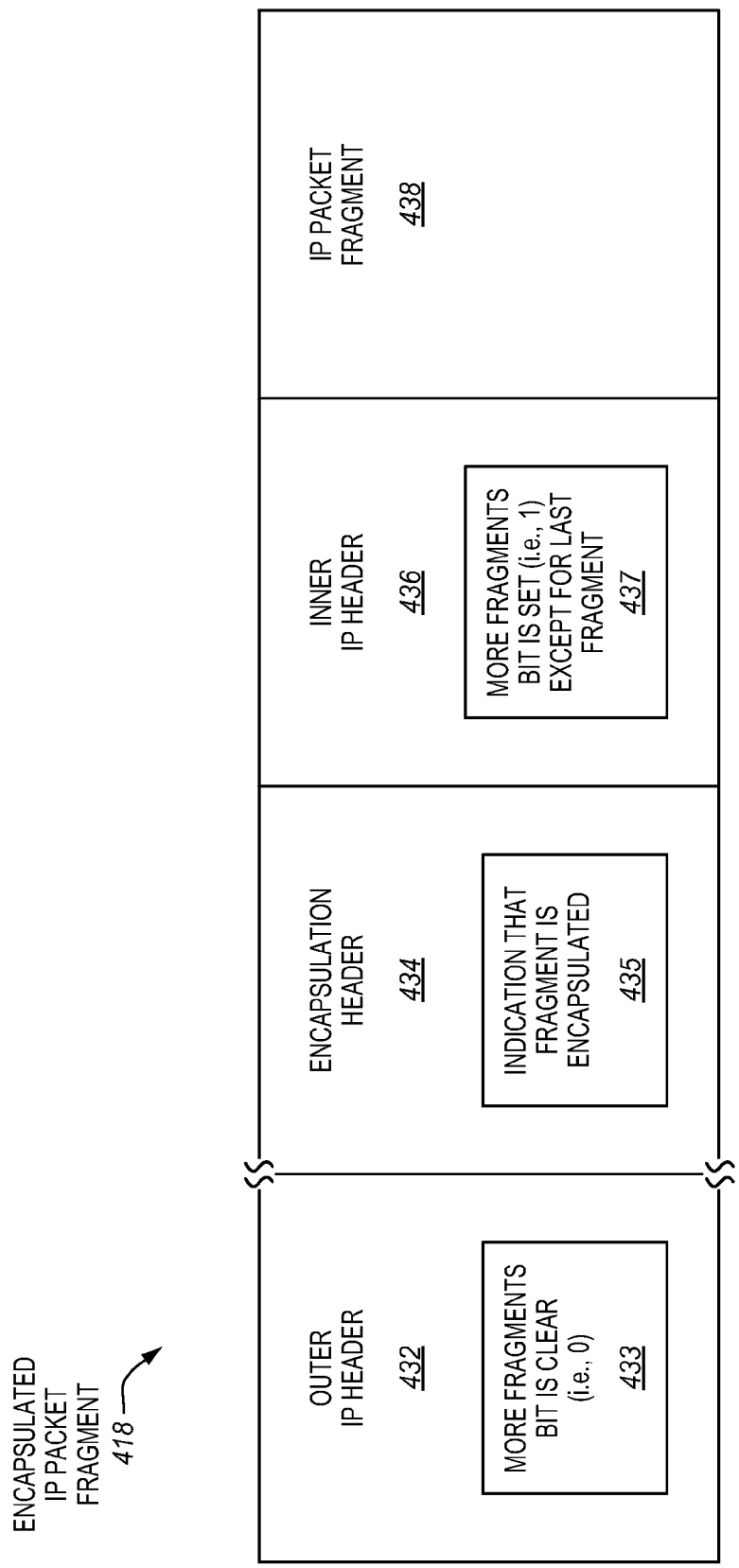
FIG. 4 is a block diagram of an embodiment of an encapsulated IP packet fragment.

FIG. 4 is a block diagram of an embodiment of an encapsulated IP packet fragment 418. The encapsulated IP packet fragment includes an outer IP header 432, an encapsulation header 434, an inner IP header 436, and an IP packet fragment 438. The terms "outer" and "inner" as used herein are relative to one another (i.e., the "outer" header is outer relative to the "inner" header but is not required to be the most outer header). In some embodiments, the outer IP header may be an IPv4 header and may have a more fragments (MF) bit 433 that is clear (i.e., has a value of binary zero). In another embodiment, the outer IP header may be an IPv6 header (e.g., an outer IPv6 header may be used to carry IPv4 fragments). In such an embodiment, the M flag of the outer IPv6 header may be cleared. In some embodiments, the encapsulation header has an indication 435 that an IP packet fragment (i.e., as opposed to an un-fragmented IP packet) is encapsulated. In some embodiments, the inner IP header is an IPv4 header and has a more fragments (MF) bit 437 that is set (i.e., has a value of binary one), unless it is the last encapsulated IP packet fragment in which case the MF bit would be clear (i.e., have a value of binary zero). Alternatively, the inner IP header may be IPv6. Optionally, other headers (not shown), such as, for example, a user datagram protocol header, or other transport protocol header, may be included between the outer IP header and the encapsulation header.

Figure 5:
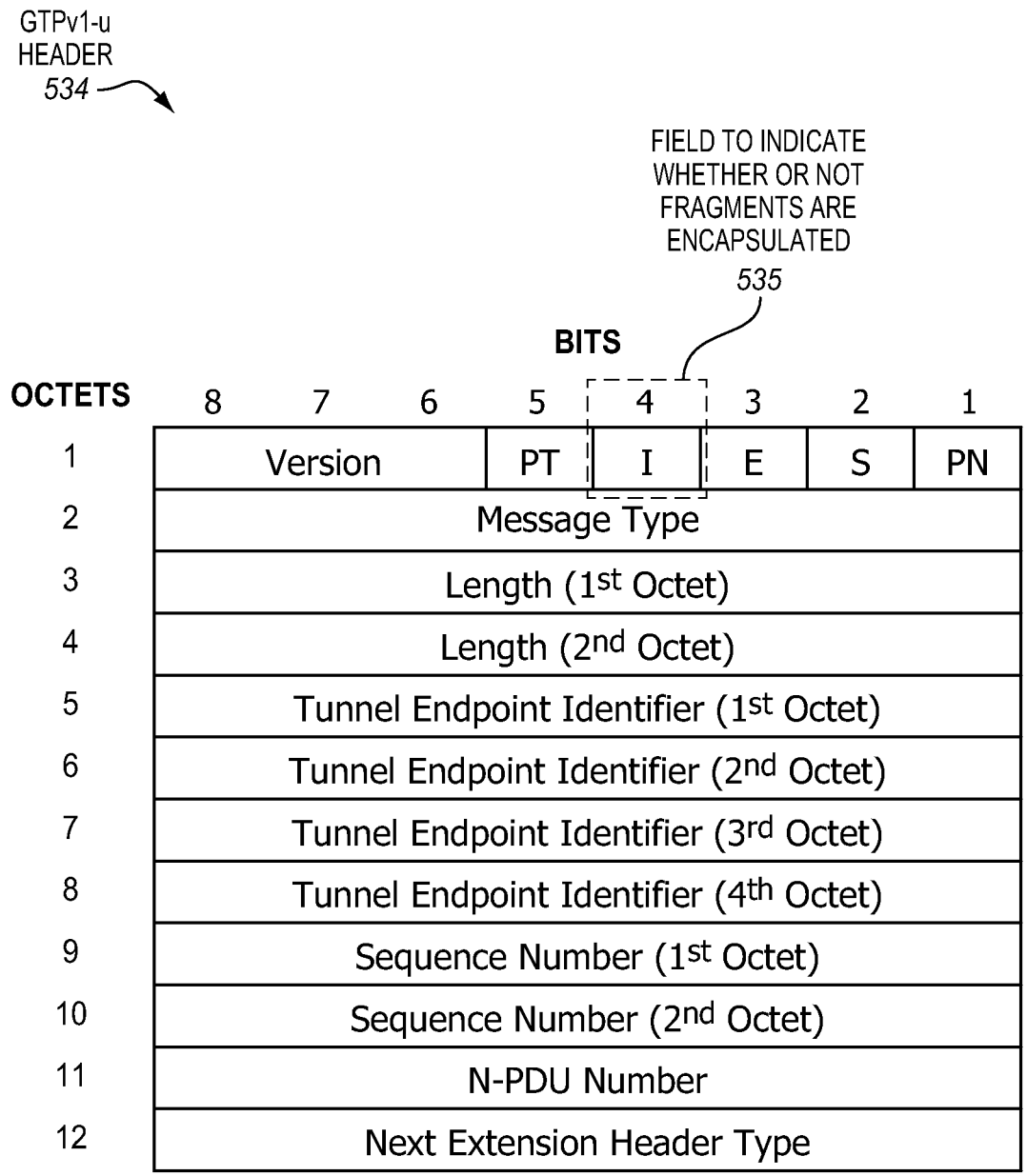
FIG. 5 is a block diagram of an example embodiment of a GTPv1-u header that is operable to indicate that an IP packet fragment is encapsulated.

FIG. 5 is a block diagram of an example embodiment of a GTPv1-U header 534 that is operable to indicate that an IP packet fragment is encapsulated. This figure follows the 1-bit based position counting scheme followed by the 3GPP specification. The illustrated GTPv1-U header has twelve octets or bytes. A first octet or byte has in a first bit a "PN" field, in a second bit an "S" field, in a third bit an "E" field, in a fourth bit an embodiment of an "I" field, in a fifth bit a "PT" field, and in a sixth through an eighth bit a "version" field. The PN, S, E, PT, and version fields may all be conventional. In one aspect, the version field may indicate a version of the header (e.g., have a value of one to indicate GTPv1). The PT field may differentiate GTP (e.g., have a value of 1) from GTP' (e.g., have a value of 0). The E field may indicate whether there is an optional extension header. The S field may indicate whether there is an optional sequence number field. The PN field may indicate whether there is an optional N-PDU field.

Refer now to the "I" field in bit 4 of the first octet. Conventionally, in GTPv1-u the fourth bit of the first octet has been spare or reserved. In some embodiments, this reserved or spare fourth bit of the first octet may be utilized as an embodiment of a field 535 to indicate whether or not fragments are encapsulated. According to one possible convention or embodiment, this bit may be set (i.e., have a binary value of one) to indicate that an IP packet fragment is encapsulated, or may be clear (i.e., have a binary value of zero) to indicate that an un-fragmented IP packet is encapsulated.

Alternatively, according to another possible convention or embodiment, this bit may be clear (i.e., have a binary value of zero) to indicate that an IP packet fragment is encapsulated, or may be set (i.e., have a binary value of one) to indicate that an un-fragmented IP packet is encapsulated. In some embodiments, the fourth or spare bit of the first octet of the GTPv1-U header may be configured (e.g., set or cleared) by an IP packet fragmentation network element. In some embodiments, an IP packet fragmentation reassembly network element may read, evaluate a value of, or otherwise examine or inspect the fourth or spare bit of the first octet of the GTPv1-U header in order to determine whether an IP packet fragment or an un-fragmented IP packet is encapsulated. By way of example, this may be used to determine whether or not reassembly of IP packet fragments is to be performed.

The second octet may indicate a message type (e.g., a type of GTP message). The third and fourth octets may indicate a length (e.g., a length of the payload in bytes). The fifth through eighth octets may indicate a tunnel endpoint identifier (TEID). The ninth and tenth octets are an optional field, which exist if any of E, S, or PN fields are on, to provide a sequence number. The eleventh octet is an optional field, which exist if any of E, S, or PN fields are on, to provide an N-PDU number. The twelvth octet is an optional field, which exist if any of E, S, or PN fields are on, to indicate a next extension header type.

This is just one example of a suitable embodiment of a GTP header. It is to be appreciated that other embodiments are not limited to the particular number, arrangement, sizes, or other attributes of these fields. Future versions of GTP, or protocols extending, replacing, or based on GTP, may remove fields, add fields, rearrange fields, change the sizes of the fields, etc., without limitation to the scope of the invention. Moreover, the specific use of the fourth bit of the first octet of the GTPv1-u header is not required to implement the invention. In other versions of GTP (e.g., GTPv0-u, GTPv2-u, etc.), other spare or reserved bits not already in use for another purpose may be used in an analogous way as the aforementioned fourth bit of the first octet in GTPv1-u. Currently, GTPv1-U is used in LTE EPC and is used in newer implementations of GGSNs and SGSNs (3GPP Release 7 and succeeding releases) used in GPRS/UMTS networks. GTPv2-U is expected to possibly be used in future in EPC or other 3GPP based networks. GTPv0-U is presently for legacy GGSNs and SGSNs (3GPP Release 7 and preceding releases). Some future GGSNs and SGSNs may still use GTPv0-U. As long as there is a field of one or more bits in a header that is available or reserved, or which otherwise does not have an already consumed function, this field may be used to indicate whether packet fragments or un-fragmented packets are encapsulated.

Figure 6:
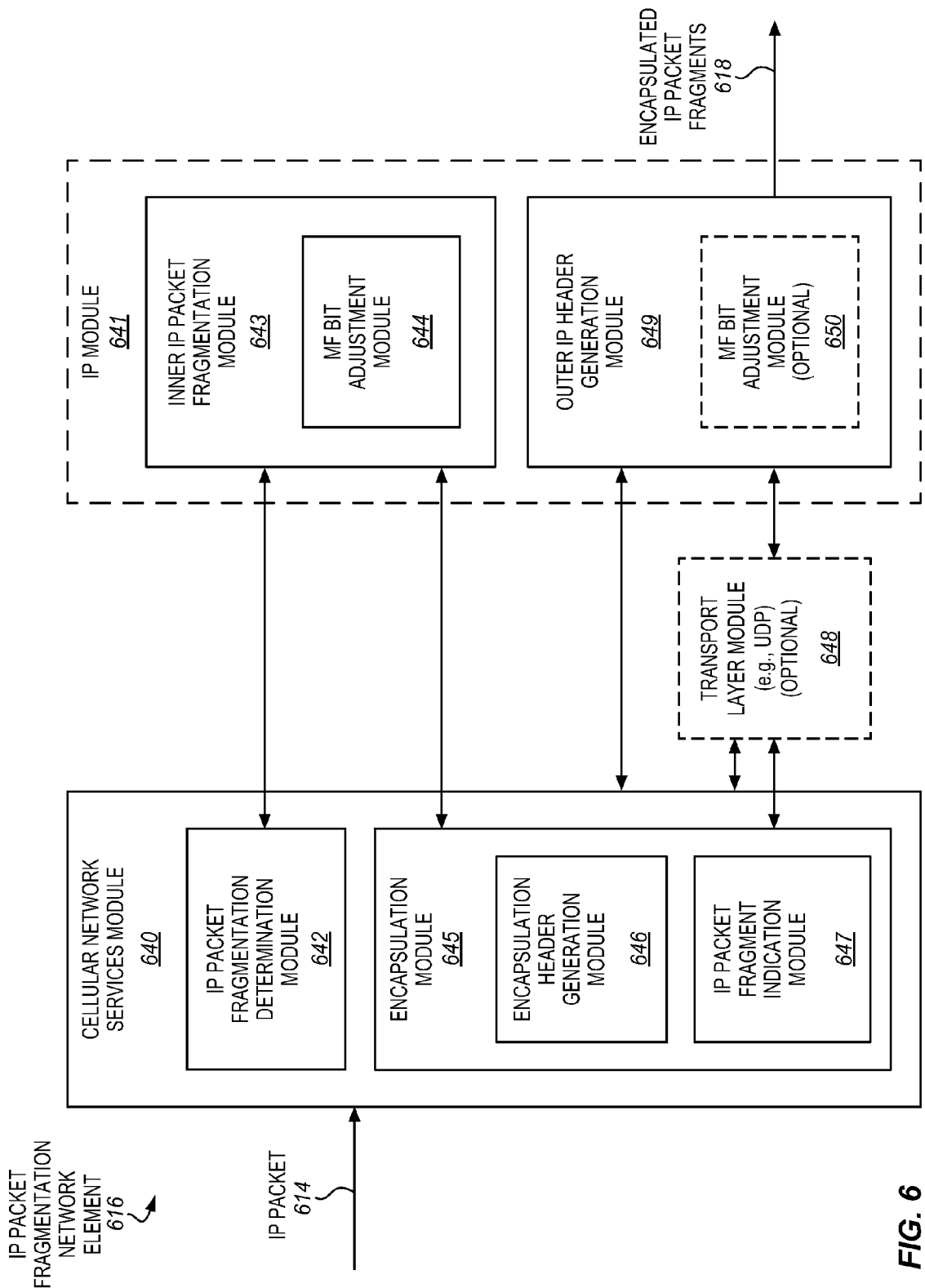
FIG. 6 is a block diagram of an embodiment of an IP packet fragmentation network element.

FIG. 6 is a block diagram of an embodiment of an IP packet fragmentation network element 616. The network element is operable to be coupled between Internet and a base station in a cellular network. The network element is operable to indicate fragmentation of an IP packet to other network elements of the cellular network, without requiring that the other network elements reassemble IP packet fragments.

In some embodiments, the network element 616 may perform the operations and/or method of FIG. 3. Alternatively, the network element 616 may perform different operations and/or methods. Moreover, the operations and/or method of FIG. 3 may be performed by either the same or a different network element. The details mentioned above for FIG. 3 generally also apply to the network element 616 but for brevity are not repeated in all cases.

As used herein, a network element (e.g., a router, switch, bridge, gateway.) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

In some embodiments, the network element may be a Packet Data Network Gateway (PDN-GW). In other embodiments, the network element may be a Serving Gateway (S-GW). In other embodiments, the network element may be a combined gateway having both PDN-GW and S-GW functionalities. Alternatively, the network element may be another type of network element or component of an Evolved Packet Core (EPC) or other network core of a cellular network (e.g., a router). In some embodiments, the network element may be a SmartEdge or an SSR Smart Service Router available from Ericsson, although this is not required.

The network element includes a cellular network services module 640 that is operable to receive the IP packet 614. In some embodiments, the cellular network services module may be an evolved packet core (EPC) services module (for PDN-GW, S-GW or for combination of PDN-GW and S-GW). In other embodiments, the cellular network services module may be a gateway General Packet Radio Service (GPRS) support node (GGSN) services module. Alternatively, the cellular network services module may be for another type of cellular network. The IP packet may have been received through a network interface (e.g., an SGi interface, an S5/S8 interface, etc.), and the cellular network services module may have been selected for the IP packet (e.g., based on a table lookup). In some embodiments, the network element may be a multiple-services network element and the cellular network services module may have been selected from among a plurality of different types of service modules (e.g., an IPSec module, VPN module, etc.). The cellular network services module may be operable to perform conventional or substantially conventional processing to obtain classification results.

An IP packet fragmentation determination module 642 is coupled with the cellular network services module. In the illustrated embodiment, the IP packet fragmentation determination module is shown as being part of the cellular network services module. Alternatively, they may be separate but coupled. The IP packet fragmentation determination module is operable to determine to fragment the IP packet received on the network interface.

An IP module 641 is coupled with the cellular network services module. An inner IP packet fragmentation module 643 of the IP module is coupled with the IP packet fragmentation determination module. The inner IP packet fragmentation module is operable to fragment the IP packet into a plurality of IP packet fragments. In some embodiments, in the case of IPv4 fragments, a more fragments (MF) bit adjustment module 644 is coupled with the inner IP packet fragmentation module. In the illustrated embodiment, the MF bit adjustment module is shown as part of the inner IP packet fragmentation module. Alternatively, they may be separate modules. The MF bit adjustment module is operable to set an MF bit in an inner IP header for each, except for a last one, of the IP packet fragments. In another embodiment, in the case of IPv6, an M flag adjustment module may be included to adjust an M flag. For clarity, while the inner IP packet fragmentation module has been labeled as "inner," in some embodiments it may be a generic module for IP packet fragmentation.

An encapsulation module 645 is coupled with the inner IP packet fragmentation module. In the illustrated embodiment, the encapsulation module is shown as being part of the cellular network services module. Alternatively, they may be separate but coupled or in communication. The encapsulation module is operable to encapsulate each of the IP packet fragments with an encapsulation header. In some embodiments, the encapsulation module comprises a GTP encapsulation module (e.g., GTPv1-u, GTPv0-u, GTPv2-u, etc.) that is operable to encapsulate each of the IP packet fragments with a GTP header. As shown, in some embodiments, the encapsulation module includes an encapsulation header generation module 646. An IP packet fragment indication module 647 is coupled with the encapsulation module. In the illustrated embodiment, the IP packet fragment indication module is shown as part of the encapsulation module. Alternatively, they may be separate modules. The IP packet fragment indication module is operable to indicate in the encapsulation headers that the IP packet fragments are encapsulated. In some embodiments, the IP packet fragment indication module may be operable to indicate this by setting a fourth bit in a first octet of a GTPv1-u header (i.e., the so-called spare or reserved bit of the first octet). Alternatively, this indication may be made in different ways for different protocols using (e.g., by using one or more available or reserved bits of those protocols).

An outer IP header generation module 649 is coupled with the encapsulation module. As shown, in some embodiments, they may be coupled by an optional intervening transport layer module 648. Examples of the transport layer module include, but are not limited to, a user datagram protocol (UDP) module and a transmission control protocol (TCP) module. The outer IP header generation module is operable to generate an outer IP header for each of the encapsulated IP packet fragments. In some embodiments, each outer IP header may be IPv4 and may have an MF bit that is cleared and/or not set. In some embodiments, an optional MF bit adjustment module 650 may be included to clear the MF bits of the outer IP headers. Alternatively, if the MF bits of the outer IP header are cleared by default, there may be no need to explicitly clear them if they are deliberately not set. In other embodiments, IPv6 headers may be used (e.g., an outer IPv6 header may be used to carry IPv4 fragments) and an optional M flag adjustment module may be included to adjust an M flag. In some embodiments, the cellular network service module may append the transport layer header and the outer IP header to the inner IP fragments. As shown, the cellular network service module may be coupled or in communication with the transport layer module and the outer IP header generation module. Encapsulated IP packet fragments may be output toward an output network interface for transmission to other network elements via the network interface.

Figure 7:
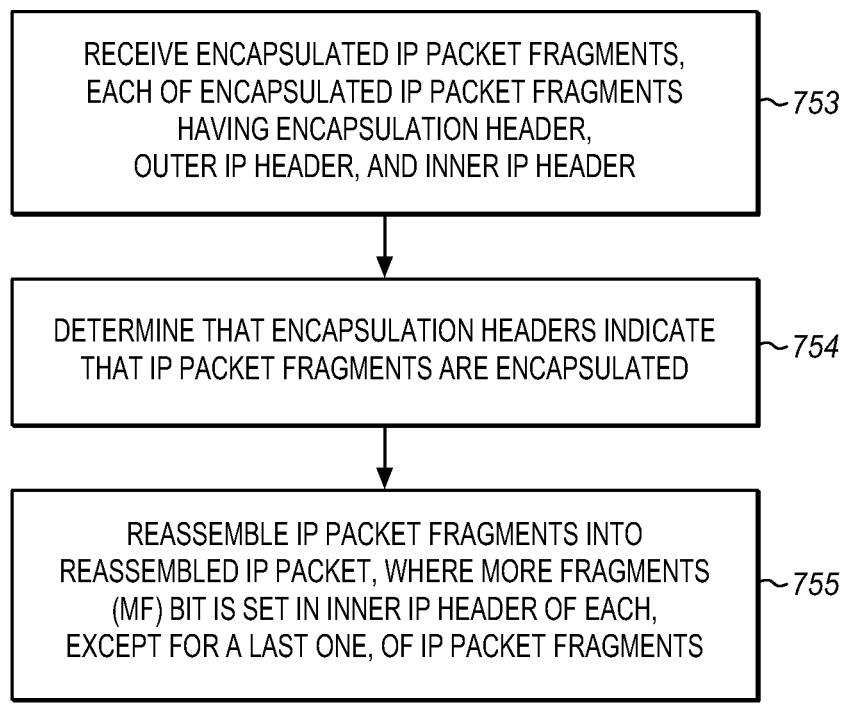
FIG. 7 is a block flow diagram of an embodiment of a method performed in an IP packet fragment reassembly system.

FIG. 7 is a block flow diagram of an embodiment of a method 752 performed in an IP packet fragment reassembly system of reassembling IP packet fragments that are destined for wireless devices and/or user equipment. The IP packet fragment reassembly system may be coupled between Internet and the wireless devices and/or user equipment in a cellular network.

In some embodiments, the IP packet fragment reassembly system may be an eNodeB or other or other IP processing portion of a base station (e.g., an IP capable base station, base station IP stack, base station controller, etc.). In other embodiments, the IP packet fragment reassembly system may be at least a portion of a cloud RAN data center implementing at least a portion of a base station protocol stack that performs IP packet fragment reassembly. In yet other embodiments, the IP packet fragment reassembly system may be an S-GW. This may be the case, for example, when additional fragmentation and reassembly would not be needed between the S-GW and the wireless devices and/or user equipment (e.g., if the reassembled packet would be smaller than the smallest MTU of all links between S-GW and the wireless devices and/or user equipment) and/or when any expected additional fragmentation and reassembly is acceptable for the particular implementation. Alternatively, the IP packet fragment reassembly system may be another network element, component, or system of the cellular network (e.g., a switch or router).

A plurality of encapsulated IP packet fragments are received, at block 753. In some embodiments, each of the encapsulated IP packet fragments have an encapsulation header, an outer IP header, and an inner IP header. In some embodiments, the encapsulation headers are GTP headers. In some embodiments, the outer IP headers do not have more fragment (MF) bits set.

A determination is made that the encapsulation headers indicate that the IP packet fragments (i.e., as opposed to un-fragmented packets) are encapsulated, at block 754. In some embodiments, when the headers are GTPv1-u headers, this may include determining a value of the fourth bit in the first octet or byte according to the 1-bit based position counting scheme followed by the 3GPP specification (i.e., the so-called "spare" or "reserved" bit of the first octet) of the GTP headers. This fourth bit is currently reserved and/or available for use. According to one possible convention, the fourth bit of a GTPv1-u header may be set (i.e., to binary one) to indicate that an IP packet fragment is encapsulated or cleared (i.e., to binary zero) to indicate that an un-fragmented packet is encapsulated. The other convention is also possible. As previously mentioned, this determination may be made in different ways when either the same or a different encapsulation protocol is used.

The IP packet fragments are reassembled into a reassembled IP packet, at block 755. For example, the IP packet fragments may be provided to an IP packet fragment reassembly unit of a base station having a base station transceiver and the IP packet fragment reassembly unit may reassemble the IP packet fragments. Alternatively, in other embodiments, a cloud RAN data center, or one or more servers or processors thereof, may reassemble the IP packet fragments. For example, the cloud RAN data center may include an IP packet fragment reassembly unit, along with IP/UDP/GTP protocol processing capability physically separated from a base station transceiver. Further, this capability may be available across multitude of logical servers executing virtual machines. In some embodiments, a more fragments (MF) bit is set (i.e., to binary one) in the inner IP header of each, except for a last one, of the IP packet fragments. In some embodiments, the set MF bits may be used to reassemble the packet fragments. Other fields conventionally may also be used for reassembly as is known in the arts (e.g., in IPv4 3 the offset field in the IP header may also be used). In the case of IPv6, in some embodiments, the M flag in the fragmentation header of IPv6 may be used to reassemble the fragments.

In some embodiments, the reassembled IP packet may be transmitted to another network element or component on a network interface. In other embodiments, signals derived from the reassembled IP packet may be transmitted to another network element or component on a network interface.

The IP packet fragment reassembly may be performed without losing the information/context carried in the encapsulation header. While processing the encapsulation header it is determined that a fragment is encapsulated. The encapsulation layer may pass the fragment to the IP packet fragment reassembly unit. The fragment may be reassembled with one or more other fragments. The reassembled IP packet may be returned back to the encapsulation layer. Instead of being stripped away and lost, the encapsulation header including the information/context (e.g., session information) of the encapsulation header is retained. The information/context provides information about where the reassembled IP packet is to be forwarded. In typical IP packet reassembly, as progression is made from the outer headers to the inner headers, the outer headers are stripped away and lost along with any information they contain. As a result, while processing the inner headers information content is not available from the outer headers but rather the packet forwarding decision needs to be made based on the content of the inner packet. However, in the present aspect, the information/context of the encapsulation header may be retained.

Advantageously, the IP packet fragment reassembly network element is able to determine from the encapsulation headers that fragments are encapsulated, and is able to reassemble the IP packet fragments (e.g., using the MF bits of the inner IP headers). This may help to avoid needing to transmit the IP packet fragments to wireless devices or other user equipment. This may have a number of possible advantages.

For one thing, performing reassembly of fragments prior to the user equipment may help to reduce the number of bits that need to be transmitted over the precious spectrum of the air interface. The Radio Link Control (RLC) layer performs segmentation of the SDUs (Service Data Units) received from the upper layer Packet Data Convergence Protocol (PDCP) at the eNodeB. The segmentation is performed to transmit appropriately sized data for reliability and error recovery purposes. If more SDUs are presented to the RLC layer via the PDCP layer, then more state information generally needs to be maintained at the RLC layer. Also, this generally implies more bits transmitted over the air interface in terms of additional RLC headers. Since each IP packet presented to the PDCP layer generally maps to an SDU at the RLC layer, transmission of as few IP packet fragments as possible is generally desirable. When reassembly of fragments is performed at the eNodeB or other IP processing portion of a base station, or at least prior to the user equipment, greater spectrum efficiency may be achieved by reducing number of bits transmitted over the precious air interface, since there are generally less RLC headers.

For another thing, this may also help to reduce the likelihood of fragments being lost. The likelihood of packet loss over an air interface generally tends to be significantly higher (e.g., at least an order of magnitude or more) than that on a wired medium. Transmitting packet fragments over the air interface tends to lead to increased probability of packet fragment discard at the user equipment if any fragments of the IP packet are not received by the user equipment (e.g., fragments are lost during transmission, or received fragments cannot be recovered after applying recovery techniques such as error correction codes, etc.). This may adversely affect the packet latency and quality of service of the user equipment. However, when reassembly is performed prior to the user equipment (e.g., at the eNodeB or other IP processing portion corresponding to a base station), the chances of such fragment discard are reduced.

For yet another thing, this may also help to avoid the wireless devices or other user equipment needing to reassemble the IP packet fragments, which may help to reduce their processing/computation burden and/or their power consumption. Without the encapsulation headers and their indication, the inner IP headers and/or their MF bits would typically not be checked by the network elements to determine that fragments were encapsulated, since this generally takes a lot of computation time and processing. Rather, the IP packet fragments would typically be transmitted over the air interface, and the reassembly would be left to the wireless devices or other user equipment. Such reassembly takes additional processing and power consumption which may not be desired especially for battery powered devices.

Figure 8:
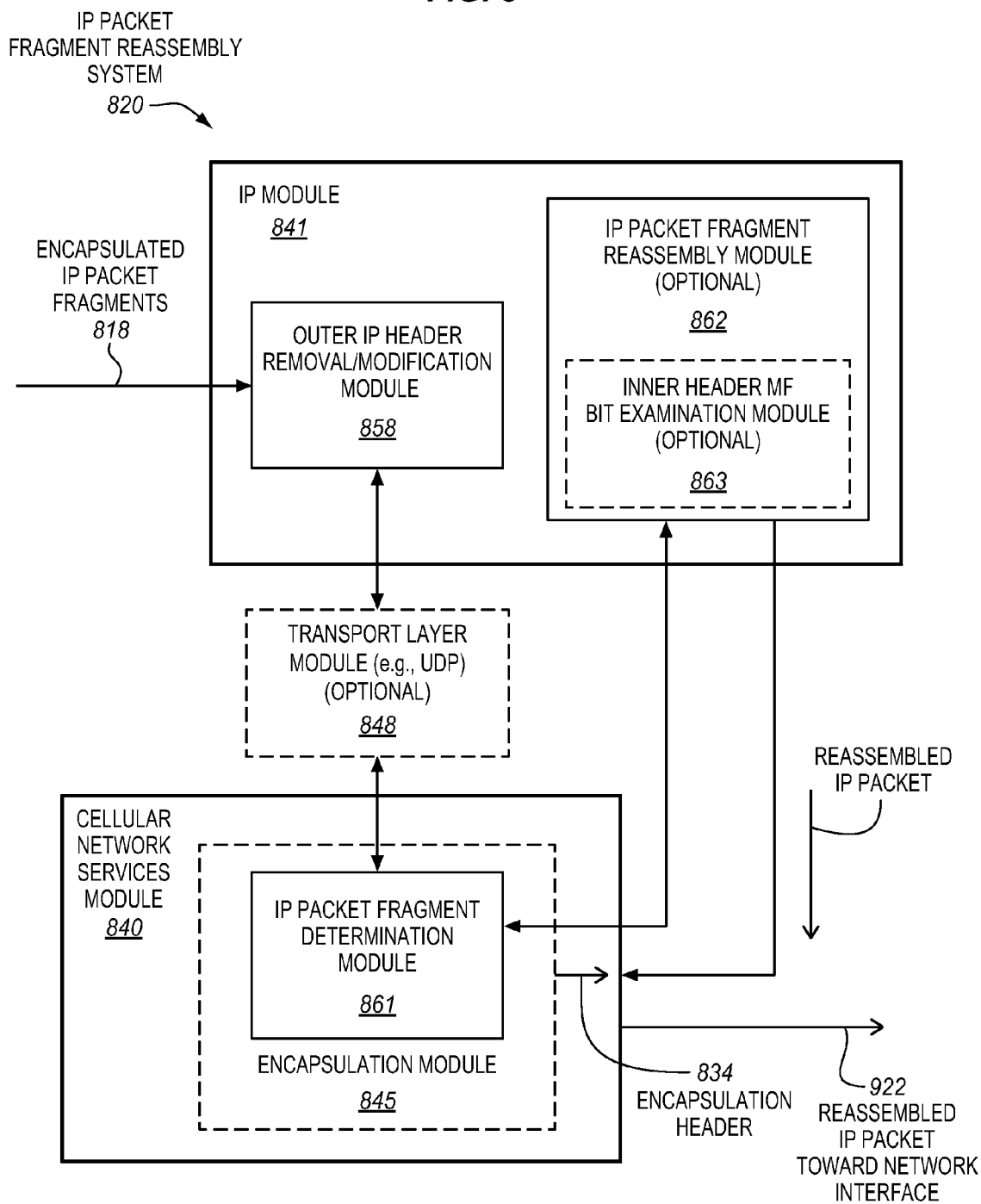
FIG. 8 is a block diagram of an embodiment of an IP packet fragment reassembly system.

FIG. 8 is a block diagram of an embodiment of an IP packet fragment reassembly system 820. The system is operable to be coupled between Internet and wireless devices in a cellular network. The system is operable to reassemble IP packet fragments that are destined for the wireless devices.

In some embodiments, the system 820 may perform the operations and/or method of FIG. 7. Alternatively, the system 820 may perform different operations and/or methods. Moreover, the operations and/or method of FIG. 7 may be performed by either the same or a different system. The details mentioned above for FIG. 7 generally also apply to the system 820 but for brevity are not repeated in all cases.

In some embodiments, the system may be an eNodeB or other IP processing portion of a base station having a base station transceiver. In other embodiments, the system may be at least a portion of a cloud RAN data center implementing at least a portion of a base station protocol stack operable to perform IP packet fragment reassembly but separate from a base station transceiver. In still other embodiments, the system may be a Serving Gateway (S-GW). Alternatively, the system may be another type of network element, component, or system of a LTE or other cellular network.

The system includes an IP module 841 that is operable to receive a plurality of encapsulated IP packet fragments 818. In some embodiments, each of the encapsulated IP packet fragments may have an encapsulation header, an outer IP header, and an inner IP header. An outer IP header removal and/or modification module 858 of the IP module is operable to remove or modify the outer IP headers. In some embodiments, the outer IP header removal module may remove and/or modify outer IPv4 headers that do not have MF bits set. In other embodiments, the outer IP header removal module may remove and/or modify outer IPv6 headers that have cleared M flags.

A cellular network services module 840 is coupled with the IP module 841 and/or the outer IP header removal and/or modification module 858. An IP packet fragment determination module 861 is coupled with the outer IP header removal/modification module by an optional transport layer module 848 (e.g., a UDP or TCP module). The IP packet fragment determination module is operable to determine that the encapsulation headers indicate that the IP packet fragments are encapsulated. In some embodiments, the encapsulation headers may be GTP headers, and the IP packet fragment determination module may be operable to determine that the IP packet fragments are encapsulated by examining a fourth or spare bit of a first octet of the GTPv1-u headers. In some embodiments, the IP packet fragment determination module is part of an encapsulation module 845, although this is not required. In some embodiments, the encapsulation module 845 is part of the cellular network services module 840. Alternatively they may be separate but coupled or in communication.

The system also includes an IP packet fragment reassembly module 862 coupled with the IP packet fragment determination module 861 that is operable to reassemble the IP packet fragments into a reassembled IP packet. An optional inner header MF bit examination module 863 is operable to examine the MF bits of the inner headers. For clarity, while the header MF bit examination module has been labeled as "inner," in some embodiments it may be a generic module for MF bit examination. In some embodiments, a MF bit may be set in the inner IP header of each, except for a last one, of the IP packet fragments. In the illustrated embodiment, the MF bit examination module is part of the IP packet fragment reassembly module. Alternatively, they may be separate modules that are coupled. In the case of IPv6, in some embodiments, the M flag in the fragmentation header of IPv6 may be used to reassemble the fragments. In such an embodiment, the inner header MF bit examination module may be replaced by an M flag examination module. Similarly, in the case of IPv6, the MF bit adjustment or examination modules described elsewhere herein may be replaced by corresponding M flag adjustment or examination modules, respectively.

A reassembled IP packet may be output. In some embodiments, the reassembled IP packet may be provided back to the cellular network services module and may be associated with a retained encapsulation header 834 which includes session information as previously described. A reassembled IP packet 922 may be advanced toward a network interface of the IP packet fragmentation system. In some embodiments, the reassembled IP packet 922 may be provided to a PDCP layer in preparation for transmission to wireless devices over an air interface. In the case of implementation in a cloud RAN data center, the PDCP layer and lower layer radio processing may happen either in the cloud or at the base station transceiver. Either the reassembled IP packet or a representation thereof (e.g., digital signals generated through additional processing) may be transmitted over a link from the cloud to a base station transceiver.

Figure 9:
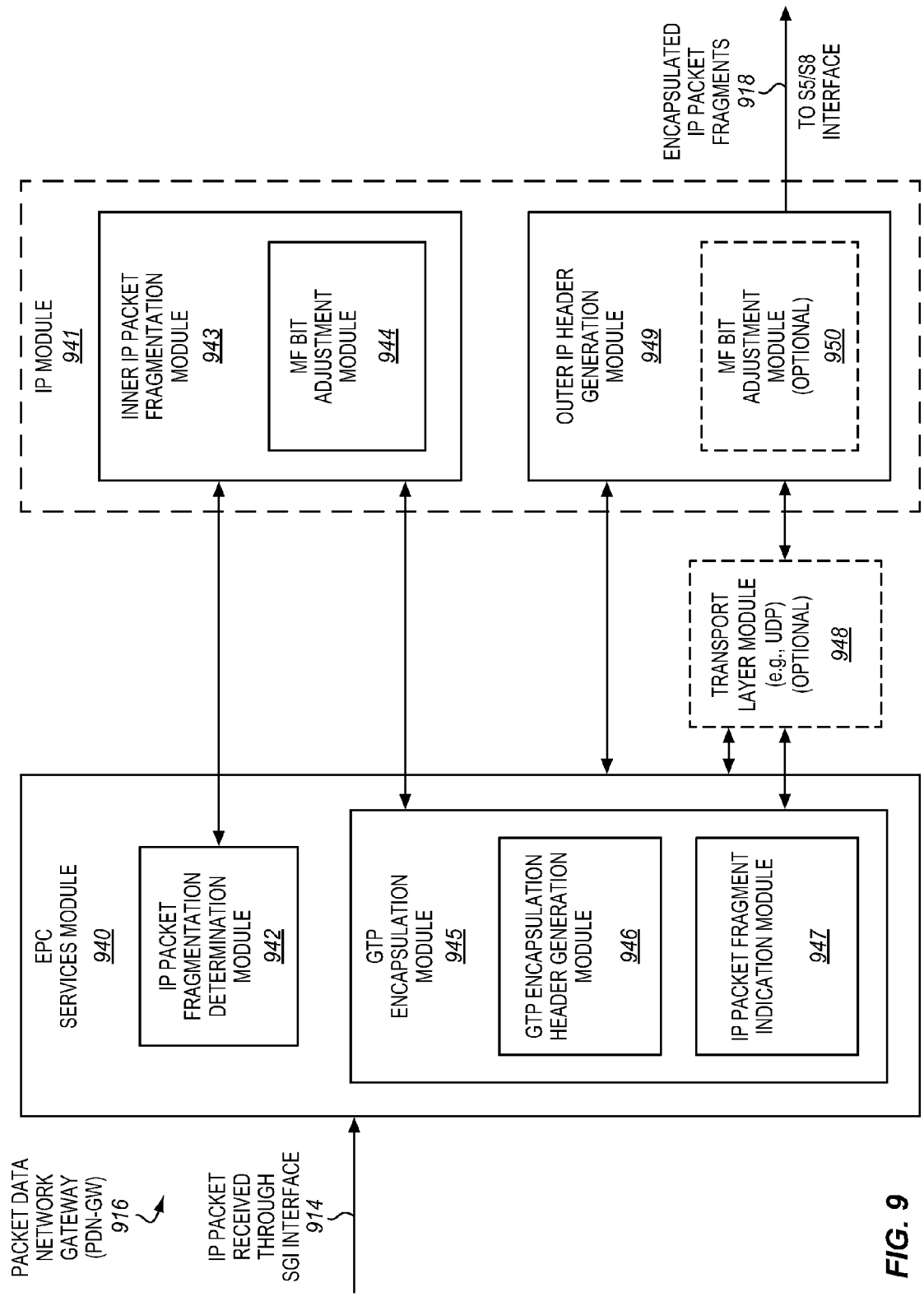
FIG. 9 is a block diagram of an embodiment of a Packet Data Network Gateway (PDN-GW).

FIG. 9 is a block diagram of an embodiment of a Packet Data Network Gateway (PDN-GW) 916. The PDN-GW is of an Evolved Packet Core (EPC) of a cellular network. The PDN-GW is operable to indicate fragmentation of an IP packet to other network elements of the EPC, without requiring that the other network elements reassemble IP packet fragments.

The PDN-GW includes an EPC services module 940 that is operable to receive the IP packet 914 which has been received through an SGi interface (not shown) of the PDN-GW. In some embodiments, the packets may have been received through some transport technologies (e.g., Metro Ethernet or Multiprotocol Label Switching (MPLS)). Received encapsulated packets may be decapsulated (e.g., by an MPLS service) and the IP packets may be delivered through the SGi interface. An IP packet fragmentation determination module 942 is coupled with the EPC services module and is operable to determine to fragment the received IP packet. An inner IP packet fragmentation module 943 is coupled with the IP packet fragmentation determination module and is operable to fragment the IP packet into a plurality of IP packet fragments. A more fragments (MF) bit adjustment module 944 is coupled with the inner IP packet fragmentation module and is operable to set an MF bit in an inner IP header for each, except for a last one, of the IP packet fragments.

A GTP encapsulation module 945 is coupled with the inner IP packet fragmentation module and is operable to encapsulate each of the IP packet fragments with a GTP encapsulation header. In the illustrated embodiment, the GTP encapsulation module is part of the EPC services module. Alternatively they may be separate but coupled or in communication. The GTP encapsulation module includes a GTP encapsulation header generation module 946. An IP packet fragment indication module 947 is coupled with the GTP encapsulation module and is operable to indicate in the GTP encapsulation headers that the IP packet fragments are encapsulated. An outer IP header generation module 949 is coupled with the GTP encapsulation module (e.g., through an intervening transport layer module 948 (e.g., a UDP module) and is operable to generate an outer IP header for each of the encapsulated IP packet fragments. In some embodiments, each outer IP header is to have an MF bit that is cleared. Some embodiments optionally have an MF bit adjustment module 950, although this is not required. In some embodiments, the EPC service module may append a UDP header and an outer IP header to an inner IP fragment in addition to the encapsulation header (e.g. GTP). The EPC service module generally has sufficient information for the UDP and outer IP headers. As shown, the EPC service module may be coupled or in communication with the transport layer module and the outer IP header generation module. Encapsulated IP packet fragments 918 are output (e.g., to a routing or data forwarding engine). The PDN-GW also includes an interface selected from an S5 interface and an S8 interface (not shown) to transmit the encapsulated IP packet fragments with the outer IP headers.

Figure 10:
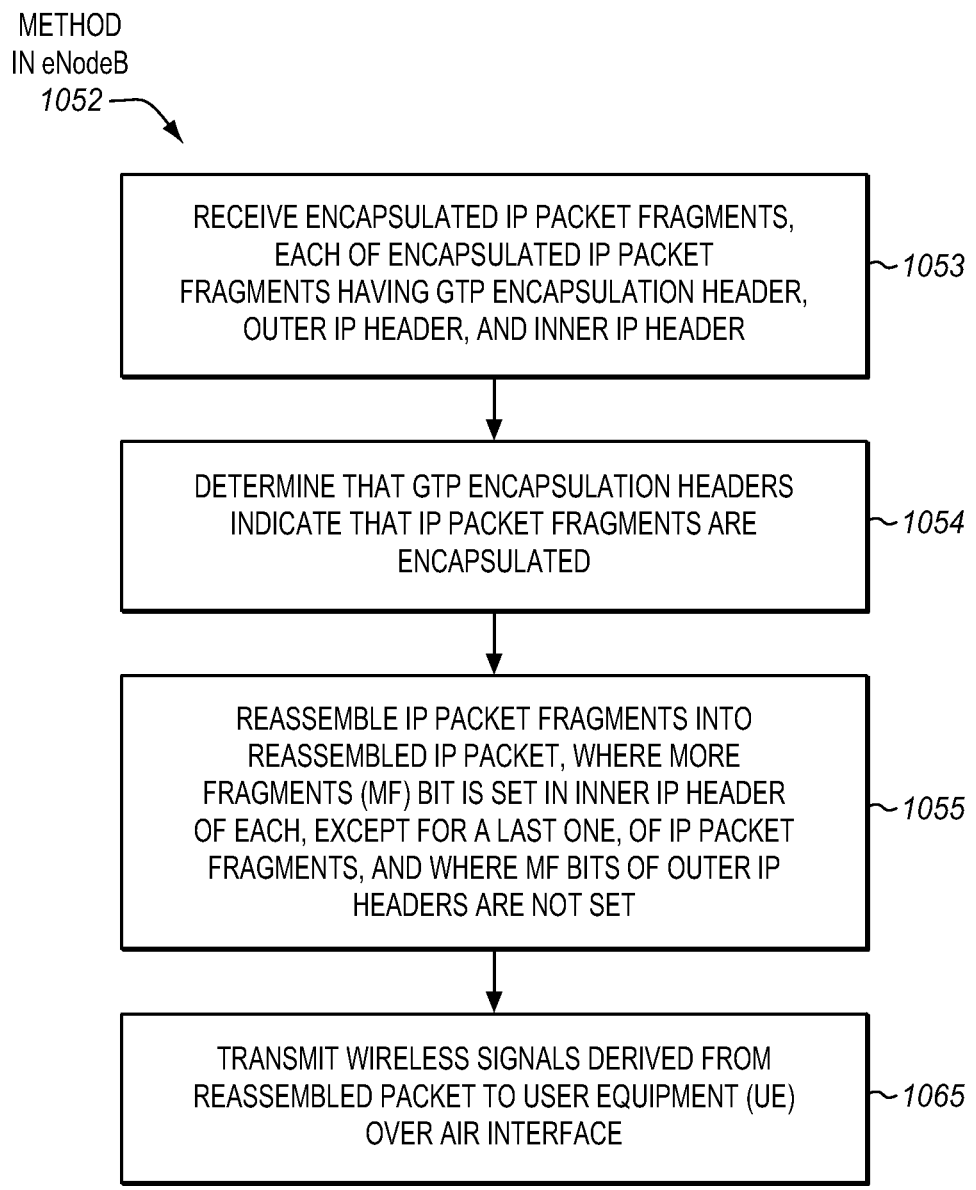
FIG. 10 is a block flow diagram of an embodiment of a method performed in an eNodeB of an LTE cellular network.

FIG. 10 is a block flow diagram of an embodiment of a method 1052, that is performed in an eNodeB of a Long Term Evolution (LTE) cellular network, of reassembling Internet Protocol (IP) packet fragments that are destined for user equipment (UE). A plurality of encapsulated IP packet fragments are received, at block 1053. The encapsulated IP packet fragments have been received through an S1-U interface. In some embodiments, each of the encapsulated IP packet fragments have a GTP encapsulation header, an outer IP header, and an inner IP header. In some embodiments, MF bits of the outer IP headers are not set.

It is determined that the GTP encapsulation headers indicate that the IP packet fragments are encapsulated, at block 1054. The IP packet fragments are reassembled into a reassembled IP packet, at block 1055. In some embodiments, a MF bit is set in the inner IP header of each, except for a last one, of the IP packet fragments. In some embodiments, the MF bits of the inner IP headers are used to reassemble the fragments.

Wireless signals derived from the reassembled IP packet are transmitted to the user equipment (UE) over an air interface, at block 1065. In some embodiments, the wireless signals represent segmented Service Data Units based on the reassembled packet.

In another embodiment, the user equipment may move such that a handover may take place from a current eNodeB that is currently handling the traffic of the user equipment to a new eNodeB that is now to handle the traffic of the user equipment. Some eNodeBs support a direct interface between eNodeBs. For example, some eNodeBs support an X2 interface which is a direct tunnel-based logical interface between the eNodeBs. During the handover, downlink packets may go to the current/old eNodeB and may be forwarded from the current eNodeB to the new eNodeB. In some embodiments, during a handover, when a current eNodeB received GTP packet that indicates that it includes a fragment, the current eNodeB may optionally skip fragment reassembly and instead forward the GTP packet to the new eNodeB (e.g., for the new eNodeB to perform the reassembly). In some aspects, the packets may be forwarded over the direct interface (e.g., the X2 interface) coupling the eNodeBs. In other aspects, the packets may be forwarded through an indirect tunnel based interface back through the S-GW (e.g., essentially reversing the direction of the packet) and to the new eNodeB. Advantageously, this may help to avoid unnecessary reassembly in the event that the packet possibly needs to be re-fragmented when it is being conveyed between the eNodeBs.

In another embodiment, where the eNodeB does not support reassembly as described above (e.g., does not recognize the fourth bit in the first octet of the GTPv1-u header), then the eNodeB may simply forward the IP packet fragments to the wireless devices or user equipment. The wireless devices or user equipment may then reassemble the IP packet fragments.

Figure 11:
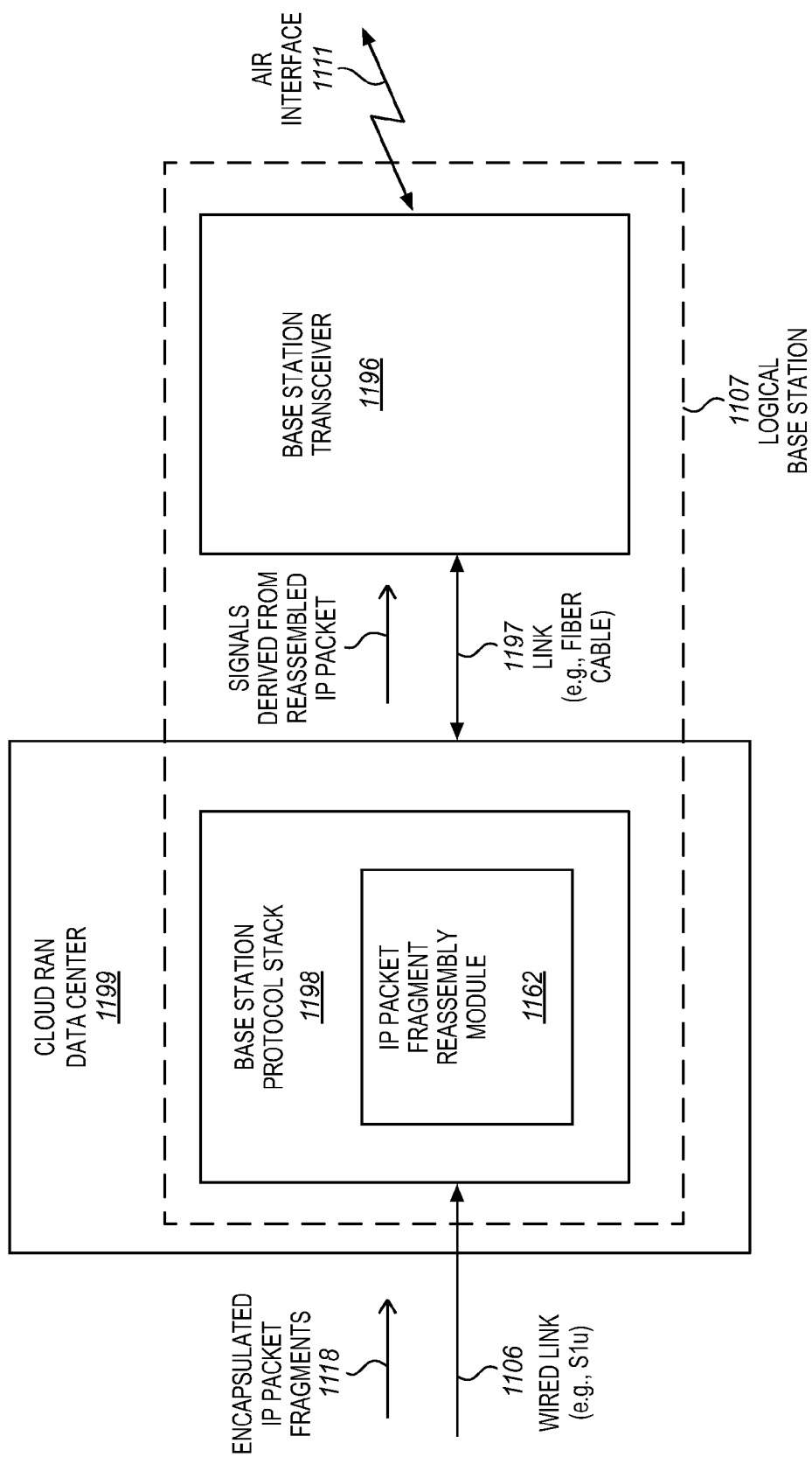
FIG. 11 is a block diagram of an embodiment of a logical base station that includes at least a portion of a base station protocol stack that is implemented on a cloud Radio Access Network (RAN) data center and a base station transceiver.

FIG. 11 is a block diagram of an embodiment of a logical base station 1107 that includes at least a portion of a base station protocol stack 1198 that is implemented on a cloud Radio Access Network (RAN) data center 1199 and a base station transceiver 1196. In some embodiments, the base station may be an eNodeB. The cloud RAN data center generally has extensive data processing and storage capabilities. For example, the data center may have anywhere from hundreds to many thousands of servers. Virtualization technology may be used to perform computational tasks associated with implementing the base station protocol stack. Anywhere from a small portion to practically all of the base station protocol stack may be implemented on the cloud RAN data center. The cloud RAN data center is coupled with a wired link 1106 (e.g., an S1U interface in the case of the base station being an eNodeB) and may receive encapsulated IP packet fragments 1118. In the illustrated embodiment, the base station protocol stack includes an IP packet fragment reassembly module 1162 that is operable to reassemble the IP packet fragments. The reassembly may be performed substantially as described elsewhere herein.

The base station transceiver is coupled with the cloud RAN data center by a link 1197 (e.g., an optical fiber cable). Signals derived from the reassembled IP packet may be provided from the cloud RAN data center to the base station transceiver over this link. The base station transceiver may be simplified as compared to a conventional base stations with at least some, a majority, or practically all of the base station protocol stack being relocated into the cloud RAN data center. In one aspect, the base station transceiver may perform a relatively limited amount of processing (e.g., radio link processing) on the received signals, and may transmit corresponding signals over an air interface 1111. Accordingly, as shown in the illustrated embodiment, the cloud RAN data center rather than the base station transceiver may perform IP packet fragment reassembly as well as other base station protocol stack processing.

Other embodiments pertain to methods performed by intervening network elements or entities that are logically disposed or coupled between IP packet fragmentation and IP packet fragment reassembly network elements. For example, other embodiments pertain to a method performed by an S-GW that is logically or physically coupled between a PDN-GW that performs fragmentation as disclosed elsewhere herein and an eNodeB that performs reassembly as disclosed elsewhere herein. In some embodiments, the intervening network element may propagate information from the encapsulation header of a received encapsulated IP fragment that indicates fragments are encapsulated to an encapsulation header of a transmitted IP fragment. For example, the S-GW may propagate the value of the spare bit in the first octet of a GTP header of an encapsulated IP packet fragment received on an S5/S8 interface to a corresponding spare bit in a first octet of a GTP header of an encapsulated IP packet fragment transmitted on an S1-U interface. In one aspect, the encapsulation header may be generated from scratch with the spare bit having the appropriate value. In another aspect, the received encapsulation header may be modified or updated and reused as the transmitted encapsulation header (e.g., after changing or updating tunnel endpoint identifiers or any other appropriate fields). Accordingly, a GTP or other encapsulation tunnel terminating network element or entity may not itself be interested in performing reassembly, but rather may propagate or forward information in an encapsulation header indicating that fragments are encapsulated to a downstream GTP or other encapsulation tunnel terminating network element.

In the description above, application of embodiments to 4G LTE cellular networks have been emphasized. However, other embodiments are not limited to use in 4G LTE cellular networks. Rather, other embodiments may be used in a 2G and/or 3G cellular network. GTPv0-U is commonly used in current 2G and 3G Universal Mobile Telecommunications System (UMTS) and/or Global System for Mobile communication (GSM) cellular networks. For example, GTPv0-U may be used to tunnel data between a Gateway General Packet Radio Service (GPRS) Support Node (GGSN) and a Serving GPRS Support Node (SGSN). The header in GTPv0-U includes various spare or reserved bits that may be used, in some embodiments, to indicate that a fragment (i.e., as opposed to an un-fragmented packet) is encapsulated. GTPv1-U may also be used for GGSNs and SGSNs. Either 4G LTE or GPRS/UMTS networks using GGSN and SGSN may also use GTPv2-U. In some embodiments, the GGSN may perform methods analogous to and/or may have modules analogous to those described above for the IP packet fragmentation network element and/or the PDN-GW. In some embodiments, the SGSN may perform methods analogous to and/or may have modules analogous to those described above for the IP packet fragment reassembly systems and/or the base stations.

In the description above, application of embodiments in a cellular networks have been emphasized. However, other embodiments are not limited to use in cellular networks. Rather, other embodiments may be used in other applications and/or environments where packet fragments encapsulated and an encapsulation header may indicate that a fragment is encapsulated.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below.

In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to effect such feature, structure, or characteristic in connection with other embodiments when appropriate whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Different embodiments of the invention may be implemented using different combinations of software, firmware, and/or hardware. Thus, the techniques shown in the figures can be implemented using code and data stored and executed on one or more electronic devices (e.g., a network element). Such electronic devices store and communicate (internally and/or with other electronic devices over a network) code and data using computer-readable media, such as tangible, non-transitory computer-readable storage media and non-tangible transitory computer-readable communication or transmission media. A few representative examples of tangible, non-transitory computer-readable storage media include, but are not limited to, magnetic disks; optical disks; random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices; phase-change memory, and the like.

Embodiments pertain to an article of manufacture that includes a tangible non-transitory computer-readable storage media storing a sequence of instructions that if executed by a machine (e.g., a network element, switch, router, or electronic device having at least one microprocessor) causes or results in the machine performing one or more operations or methods disclosed herein. A few representative examples of non-tangible transitory computer-readable transmission media include, but are not limited to, electrical, optical, acoustical or other form of propagated signals such as carrier waves, infrared signals, digital signals. In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A Packet Data Network Gateway (PDN-GW), of an Evolved Packet Core (EPC) of a cellular network, which is operable to indicate fragmentation of an Internet Protocol (IP) packet to other network elements of the EPC, without requiring that the other network elements reassemble IP packet fragments, said PDN-GW comprising:
    an EPC services module to receive the IP packet which has been received through an SGi interface;
    an IP packet fragmentation determination module, coupled with the EPC services module, to determine to fragment the received IP packet;
    an inner IP packet fragmentation module, coupled with the IP packet fragmentation determination module, to fragment the IP packet into a plurality of IP packet fragments;
    a more fragments (MF) bit adjustment module, coupled with the inner IP packet fragmentation module, to set an MF bit in an inner IP header for each, except for a last one, of the IP packet fragments;
    a General Packet Radio Service Tunneling Protocol (GTP) encapsulation module, coupled with the inner IP packet fragmentation module, to encapsulate as a payload each of the IP packet fragments and its inner IP header with a GTP encapsulation header;
    an IP packet fragment indication module, coupled with the GTP encapsulation module, to indicate in the GTP encapsulation headers that the payloads include IP packet fragments;
    an outer IP header generation module, coupled with the GTP encapsulation module, to generate an outer IP header for each of the encapsulated IP packet fragments, wherein each outer IP header has an MF bit that is cleared; and
    an interface selected from an S5 interface and an S8 interface to transmit the encapsulated IP packet fragments with the outer IP headers.

2. The PDN-GW of claim 1, wherein the IP packet fragment indication module marks a bit in the GTP encapsulation headers to indicate that the payloads include IP packet fragments.

3. The PDN-GW of claim 1, wherein the outer IP headers are IPv6 headers.

* * * * *